United States Patent
Gold et al.

(10) Patent No.: US 8,511,450 B2
(45) Date of Patent: Aug. 20, 2013

(54) MULTIPLE CLUTCH DEVICE HAVING TWO PRESSURE EQUALIZATION CHAMBERS

(75) Inventors: Eckart Gold, Hockenheim (DE); Marcus Hertel, Bruchsal (DE); Tobias Groepper, Heidelberg (DE)

(73) Assignee: Borgwarner Inc., Auburn Hills, MI (US)

( * ) Notice: Subject to any disclaimer, the term of this patent is extended or adjusted under 35 U.S.C. 154(b) by 369 days.

(21) Appl. No.: 12/994,191

(22) PCT Filed: Jun. 1, 2009

(86) PCT No.: PCT/US2009/045805
§ 371 (c)(1),
(2), (4) Date: Nov. 23, 2010

(87) PCT Pub. No.: WO2009/148999
PCT Pub. Date: Dec. 10, 2009

(65) Prior Publication Data
US 2011/0073434 A1    Mar. 31, 2011

(30) Foreign Application Priority Data

Jun. 3, 2008 (DE) .......................... 10 2008 026 476
Dec. 4, 2008 (DE) .......................... 10 2008 060 580

(51) Int. Cl.
*F16D 25/0638* (2006.01)
*F16D 48/02* (2006.01)

(52) U.S. Cl.
USPC ............... 192/48.619; 192/70.12; 192/106 F; 192/113.34

(58) Field of Classification Search
USPC .................................................. 192/48.619
See application file for complete search history.

(56) References Cited

U.S. PATENT DOCUMENTS

| | | | |
|---|---|---|---|
| 6,454,074 B1 * | 9/2002 | Kundermann et al. | 192/106 F |
| 6,464,059 B1 | 10/2002 | Kundermann et al. | |
| 7,147,095 B2 | 12/2006 | Kraxner et al. | |
| 7,287,634 B2 | 10/2007 | Agner et al. | |
| 7,527,136 B2 * | 5/2009 | Gierling | 192/106 F |
| 7,954,615 B2 * | 6/2011 | Tiesler et al. | 192/48.619 |
| 2003/0057051 A1 | 3/2003 | Alfredsson | |
| 2005/0067251 A1 | 3/2005 | Braford et al. | |
| 2005/0284722 A1 * | 12/2005 | Heinrich et al. | 192/70.12 |
| 2005/0284725 A1 | 12/2005 | Bauer et al. | |

(Continued)

FOREIGN PATENT DOCUMENTS

| | | |
|---|---|---|
| JP | 2008/057645 A | 3/2008 |
| WO | WO 2005/047739 A1 * | 5/2005 |
| WO | WO 2007/113143 A1 * | 10/2007 |

*Primary Examiner* — Rodney Bonck
(74) *Attorney, Agent, or Firm* — Miller, Matthias & Hull LLP (57) ABSTRACT

The present invention relates to a multiple clutch device having a first clutch which is assigned a first actuating piston with a first pressure chamber and a first pressure equalization chamber, and having a second clutch which is assigned a second actuating piston with a second pressure chamber and a second pressure equalization chamber, a first crossflow channel being provided for setting the hydraulic fluid column in the first pressure equalization chamber and a second crossflow channel being provided for setting the hydraulic fluid column in the second pressure equalization chamber. According to the invention, the first and second crossflow channels are arranged in such a way that both the oil which is discharged via the first crossflow channel and the oil which is discharged via the second crossflow channel can be fed to the first and second clutches.

14 Claims, 2 Drawing Sheets

(56) References Cited

U.S. PATENT DOCUMENTS

2006/0042909 A1 * 3/2006 De Maziere ............... 192/106 F
2006/0289269 A1 12/2006 Tiesler
2007/0221468 A1 9/2007 George et al.

* cited by examiner

MULTIPLE CLUTCH DEVICE HAVING TWO PRESSURE EQUALIZATION CHAMBERS

CROSS-REFERENCE TO RELATED APPLICATIONS

This application is a U.S. National Stage filing under 35 USC §371 of PCT Patent Application No. PCT/US2009/045805 filed on Jun. 1, 2009, claiming priority under the Paris Convention to German Patent Application No. DE 102008060580.8 filed on Dec. 4, 2008.

FIELD OF THE DISCLOSURE

The present invention relates to a multiple clutch device having a first clutch which is assigned a first actuating piston with a first pressure chamber and a first pressure equalization chamber, and having a second clutch which is assigned a second actuating piston with a second pressure chamber and a second pressure equalization chamber, a first crossflow channel being provided for setting the hydraulic fluid column in the first pressure equalization chamber and a second crossflow channel being provided for setting the hydraulic fluid column in the second pressure equalization chamber.

BACKGROUND OF THE DISCLOSURE

Hydraulically actuable multiple clutch devices are known from the prior art, which devices are usually what are known as dual clutches. For instance, the known dual clutches comprise a first clutch and a second clutch, it being possible for the first clutch to be actuated via an axially displaceable first actuating piston and for the second clutch to be actuated via an axially displaceable second actuating piston. In order for it to be possible for the actuating pistons to be displaced hydraulically in the axial direction, the actuating pistons are in each case assigned a pressure chamber and a pressure equalization chamber. For instance, the first actuating piston is assigned a first pressure chamber and a first pressure equalization chamber, while the second actuating piston is assigned a second pressure chamber and a second pressure equalization chamber. In the case of a rotation of the known multiple clutch device, in each case a first radially extending hydraulic fluid column is produced in the pressure chambers, with the result that an axial force is exerted in one axial direction on the respective actuating piston, while in each case a second hydraulic fluid column is produced in the pressure equalization chambers, which second hydraulic fluid column produces an axial force which acts in the opposite axial direction on the respective actuating piston. In order to achieve a situation where the axial forces which oppose one another balance one another substantially, that is to say to achieve what is known as a hydraulic fluid balance, a first crossflow channel is provided for setting or shortening the hydraulic fluid column in the first pressure equalization chamber, and a second crossflow channel is provided for setting or shortening the hydraulic fluid column in the second pressure equalization chamber. The oil which flows out of the pressure equalization chambers and through the crossflow channels is discharged to the outside in the radial direction.

The known multiple clutch devices have proven themselves, in so far as a simple hydraulic oil balance can be achieved, but are disadvantageous, in so far as both the first and the second clutches are subjected to increased wear.

SUMMARY OF THE DISCLOSURE

It is therefore an object of the present invention to provide a multiple clutch device with at least two clutches, in which device firstly a hydraulic fluid balance is realized and secondly the wear to the clutches is reduced, with the result that an increased service life of the clutches is achieved.

The multiple clutch device according to the invention, which is preferably a dual clutch, can be configured, for example, as a multiple disk clutch. The multiple clutch device thus has a first clutch and a second clutch. In order for it to be possible for the two clutches to be actuated independently of one another, actuating pistons are provided, furthermore, which can preferably be displaced axially. The first clutch is thus assigned a first actuating piston, while the second clutch is assigned a second actuating piston. In turn, the first actuating piston is assigned a first pressure chamber, which can be arranged, for example, in front of the actuating piston in one axial direction, and a first pressure equalization chamber which can be arranged, for example, in front of the actuating piston in the opposite axial direction. In a corresponding manner, the second actuating piston is assigned a second pressure chamber and a second pressure equalization chamber. Here, the pressure chamber is to be understood as that chamber, in which the pressure can be increased or reduced in a targeted manner, in order to achieve a movement of the respective actuating piston. In the case of a rotation of the multiple clutch device, hydraulic fluid columns are produced in the pressure chambers and pressure equalization chambers which are assigned to one another, which hydraulic fluid columns cause axial forces which oppose one another and act on the respective actuating piston, on account of the centrifugal force. In order that the axial forces which oppose one another can balance one another substantially, the hydraulic fluid column is set or shortened correspondingly in the two pressure equalization chambers. For this purpose, a first crossflow channel is provided for setting the hydraulic fluid column in the first pressure equalization chamber and a second crossflow channel is provided for setting the hydraulic fluid column in the second pressure equalization chamber. It is to be noted that a plurality of first and/or second crossflow channels can also be provided, a plurality of first crossflow channels being advantageous, in particular. According to the invention, the first and second crossflow channels are arranged in such a way that both the oil which is discharged out of the first pressure equalization chamber via the first crossflow channel and the oil which is discharged out of the second pressure equalization chamber via the second crossflow channel can be fed to the first and second clutches.

Accordingly, in contrast to the prior art, both the oil which emerges from the first crossflow channel and the oil which emerges from the second crossflow channel are used to cool the first and second clutches, with the result that the emerging oil is not simply discharged and is thus lost via the cooling and lubrication of the two clutches. It has been shown that the cooling and lubrication of the two clutches can be improved effectively as a result, with the result that the temperature-induced wear of the two clutches is lower and the service life of the multiple clutch device is increased.

In order to achieve a particularly simple construction of the multiple clutch device, in which construction the oil which is discharged via the first and second crossflow channels can be fed to both the first and the second clutch, the first crossflow channel in one preferred embodiment of the multiple clutch device according to the invention is arranged in such a way that the oil which is discharged via the first crossflow channel is fed to the second pressure equalization chamber and/or the second crossflow channel. Subsequently, the oil which is discharged via the first crossflow channel can be fed via the second crossflow channel to both the first and the second clutch.

In order to provide a particularly simple connection of the first pressure equalization chamber via the first crossflow channel to the second pressure equalization chamber and/or the second crossflow channel, which connection makes a modified arrangement and dimensions of the pressure chambers, in particular of the second pressure chamber, largely unnecessary, the first crossflow channel is formed in a clutch hub in one particularly preferred embodiment of the multiple clutch device according to the invention. In this embodiment, the first crossflow channel affords a particularly reliable connection between the first pressure equalization chamber and the second pressure equalization chamber and/or the second crossflow channel, without it being necessary for further components of the multiple clutch device to be modified or rearranged, apart from the clutch hub. It is particularly advantageous in this embodiment if the first crossflow channel is cast or drilled into the clutch hub. Since, in dual clutches, the second pressure chamber is as a rule situated in the axial direction between the first pressure equalization chamber and the second pressure equalization chamber, it is preferred, furthermore, if the first crossflow channel is formed in the clutch hub, bypassing the second pressure chamber. In this way, the seal of the second pressure chamber and therefore the functionality of the actuating pistons are ensured.

In one advantageous embodiment of the multiple clutch device according to the invention, furthermore, supply channels are formed in the clutch hub for supplying the first and second pressure chambers with the pressure medium, the pressure medium preferably being oil. In this embodiment, the clutch hub therefore accommodates both the first crossflow channel and the supply channels for the pressure chambers, with the result that the first crossflow channel and the supply channels can already be produced in the context of the manufacture of the clutch hub. It is to be ensured here that there is no flow connection at all between the first crossflow channel and one of the supply channels for the pressure chambers, since otherwise the actuating pistons could no longer be driven hydraulically. It is also preferred in this embodiment if the supply channels for supplying the first and second pressure chambers are cast or drilled into the clutch hub.

In order to make it possible that a hydraulic fluid column can also be formed inside the pressure equalization chambers, furthermore, in a further advantageous embodiment of the multiple clutch device according to the invention, at least one equalization channel is formed in the clutch hub for supplying the first and second pressure equalization chambers with oil. For example, the two pressure equalization chambers can thus be supplied with oil via a common equalization channel or via individual or a plurality of separate equalization channels. As has already been mentioned in the preceding text, this embodiment can be produced particularly simply, especially since the first crossflow channel, the supply channels and the equalization channel or channels can already be produced in the context of the manufacture of the clutch hub. In this embodiment, the equalization channel is preferably cast, milled, turned or drilled into the clutch hub.

As has already been indicated in the preceding text, an equalization channel or a plurality of separate equalization channels can be formed within the clutch hub for each of the two pressure equalization chambers, which equalization channels lead directly into the respective pressure equalization chamber. In order to reduce the manufacturing outlay for the clutch hub, in one particularly advantageous embodiment of the multiple clutch device according to the invention, however, the equalization channel is flow-connected to the first crossflow channel in such a way that the oil which is fed via the equalization channel can be fed via the first crossflow channel to the first and second pressure equalization chambers. In this way, the first crossflow channel is used not only for discharging the oil out of the first pressure equalization channel, but also serves, moreover, to distribute the oil which is fed via the equalization channel or channels into the first and second pressure equalization chambers. This has the consequence that the equalization channel or channels can be produced particularly simply by the first crossflow channel which is present in any case being used for the distribution of the oil to the two pressure equalization chambers.

In a further preferred embodiment of the multiple clutch device according to the invention which is based on the above-described embodiment, the equalization channel is formed as a circumferential, inner groove on the clutch hub. It is advantageous here if the circumferential groove is turned or milled into the clutch hub. Thanks to the equalization channel which is configured as a circumferential groove, the flow connection between the equalization channel on one side and the first crossflow channel on the other side can be achieved particularly reliably and without relatively great outlay, with the result that the manufacture of the clutch hub is simplified further.

In order to ensure reliable supplying of the pressure equalization chambers via the first crossflow channel which is flow-connected to the equalization channel, in a further preferred embodiment of the multiple clutch device according to the invention, the first crossflow channel extends parallel, preferably rectilinearly, with respect to the rotational axis of the multiple clutch device, and/or the inlet and outlet openings of the first crossflow channel are arranged at the same height in relation to the radial direction.

According to a further advantageous embodiment of the multiple clutch device according to the invention, the first crossflow channel and the second crossflow channel in each case have an inlet opening. Here, the inlet opening is understood to mean that opening of the respective crossflow channel which faces the respective pressure equalization chamber. In this embodiment, the inlet openings can be arranged at the same height or at different heights in relation to the radial direction. Here, the alternative which is mentioned first should be selected if a sufficient hydraulic fluid balance can be brought about by the inlet openings at the same level for both actuating pistons. The alternative which is mentioned second is recommended, for example, when a sufficient hydraulic oil balance can be achieved for each individual actuating piston only by inlet openings at different levels.

Furthermore, one embodiment of the multiple clutch device according to the invention has proven particularly advantageous, in which the inlet opening of the first crossflow channel is arranged further to the inside in relation to the radial direction than the inlet opening of the second crossflow channel. In this embodiment, particularly rapid and targeted discharging of the excess oil out of the two pressure equalization chambers could be determined, which makes reliable cooling and lubrication of the first and second clutches possible.

In a further particularly preferred embodiment of the multiple clutch device according to the invention, the first and second clutches are arranged in a nested manner in the radial direction. In this embodiment, one could also say that the first clutch surrounds the second clutch or vice versa. In a multiple clutch device of this type which can also be called a concentric clutch device, it is particularly difficult, on account of the nested arrangement of first and second clutches, to feed both the oil which is discharged out of the first pressure equalization chamber and the oil which is discharged out of the second pressure equalization chamber to the two clutches. This is to be attributed to the fact that as a rule no suitable space which extends in the radial direction is available within the clutch device for the formation of the first crossflow channel. For this reason, it is preferred in this embodiment if the first crossflow channel is arranged in such a way that the oil which is discharged via the first crossflow channel can be fed to the second pressure equalization chamber and/or the second crossflow channel, as has already been described in the preceding text with reference to one preferred embodiment of the multiple clutch device according to the invention. Moreover, in the multiple clutch device with a first and second clutch arranged in a nested manner in the radial direction, it is preferred if the first crossflow channel is formed within the clutch hub, especially since no further components of the multiple clutch device have to be adapted or modified as a result.

In a further advantageous embodiment of the multiple clutch device according to the invention, in particular in a multiple clutch device with a first and second clutch nested in the radial direction, the first and second crossflow channels are arranged in such a way that the oil which is discharged via the first and second crossflow channels can be fed first of all to one clutch and subsequently to the other clutch. Thus, in a first and second clutch arranged in a nested manner in the radial direction, the discharged oil could be fed, for example, first of all to the inner clutch of the two clutches, could pass through said inner clutch and could subsequently pass to the outer clutch of the two clutches. On account of the fact that the oil quantity which is fed to the clutches is composed firstly of the excess oil in the first pressure equalization chamber and secondly of the excess oil from the second pressure equalization chamber, the oil quantity which is fed to the clutches is so great that, in this embodiment as well, sufficient cooling and lubrication of that clutch is ensured, to which the discharged oil passes only after cooling of the other clutch.

In a further advantageous embodiment of the multiple clutch device according to the invention, the first clutch is formed by a first multiple disk assembly and the second clutch is formed by a second multiple disk assembly. Here, a multiple disk assembly is to be understood, for example, as the alternate sequence of inner and outer disks in the axial direction. The first and second multiple disk assemblies are preferably assigned multiple disk carriers which have oil passage openings, via which the oil which is discharged via the crossflow channels can be guided from one multiple disk assembly to the other multiple disk carrier, preferably in the radial direction. The oil passage openings should thus be provided in the multiple disk carrying sections of the multiple disk carriers, in order to make a direct supply of the discharged oil to the multiple disk assemblies possible.

According to a further preferred embodiment of the multiple clutch device according to the invention, the second crossflow channel is formed between a multiple disk carrier, preferably an inner disk carrier, particularly preferably an inner disk carrier of the inner clutch of the two clutches, and a support plate which is arranged on the clutch hub. In this way, the clearance which is present between the multiple disk carrier and the support plate can be used as second crossflow channel. Here, the support plate is preferably of cup-shaped configuration and delimits the second pressure equalization chamber. Furthermore, it is preferred if the support plate has been fastened retrospectively and optionally releasably to the clutch hub, especially since, in principle, the level of the inlet opening of the second crossflow channel can also be fixed in the radial direction by the selection of a support plate of corresponding dimensions. In this embodiment, the support plate therefore firstly has the function of defining the second pressure equalization chamber and preferably of determining the level of the inlet opening of the second crossflow channel in the radial direction. Secondly, in conjunction with the multiple disk carrier, the support plate serves to form the second crossflow channel.

In a further preferred embodiment of the multiple clutch device according to the invention which is based on the embodiment described in the preceding text, at least one cutout is provided for forming the inlet opening of the second crossflow channel in the support plate. In this embodiment, there is the particular advantage that no complicated drilling or milling machining of the clutch hub is required.

In a further preferred embodiment of the multiple clutch device according to the invention which is based on one of the embodiments described in the preceding text, furthermore, a restoring spring is provided for the second actuating piston, which restoring spring is supported firstly on the support plate and secondly on the second actuating piston. The support plate therefore assumes a further function, without an additional component being required for supporting the restoring spring. In this embodiment, as also in the embodiment described in the preceding text, it is advantageous if the support plate is supported on the clutch hub in the axial direction, which can be carried out, for example, with the aid of a corresponding securing ring.

In a further advantageous embodiment of the multiple clutch device according to the invention, by rotation of the multiple clutch device, an axial force which acts on the actuating piston can be produced in the pressure chamber by a radially extending first hydraulic fluid column, and an opposite axial force which acts on the actuating piston can be produced in the pressure equalization chamber by a radially extending second hydraulic fluid column, the crossflow channel opening into the pressure equalization chamber in such a way that the length of the second hydraulic fluid column is shortened in the radial direction in such a way that the axial forces which oppose one another and act on the actuating piston balance one another substantially. A balance of the axial forces which oppose one another substantially is to be understood here to be at least a 90% balance, preferably at least a 95% balance, particularly preferably a 100% balance. The above features are preferably valid both for the first pressure chamber, the first pressure equalization chamber, the first actuating piston and the first crossflow channel, and also for the second pressure chamber, the second pressure equalization chamber, the second actuating piston and the second crossflow channel, with the result that a hydraulic fluid balance can be achieved for both actuating pistons in equal measure.

BRIEF DESCRIPTION OF THE DRAWINGS

In the following text, the invention will be explained in greater detail using exemplary embodiments with reference to the appended drawings, in which.

DETAILED DESCRIPTION OF THE DISCLOSURE

Figure 1:
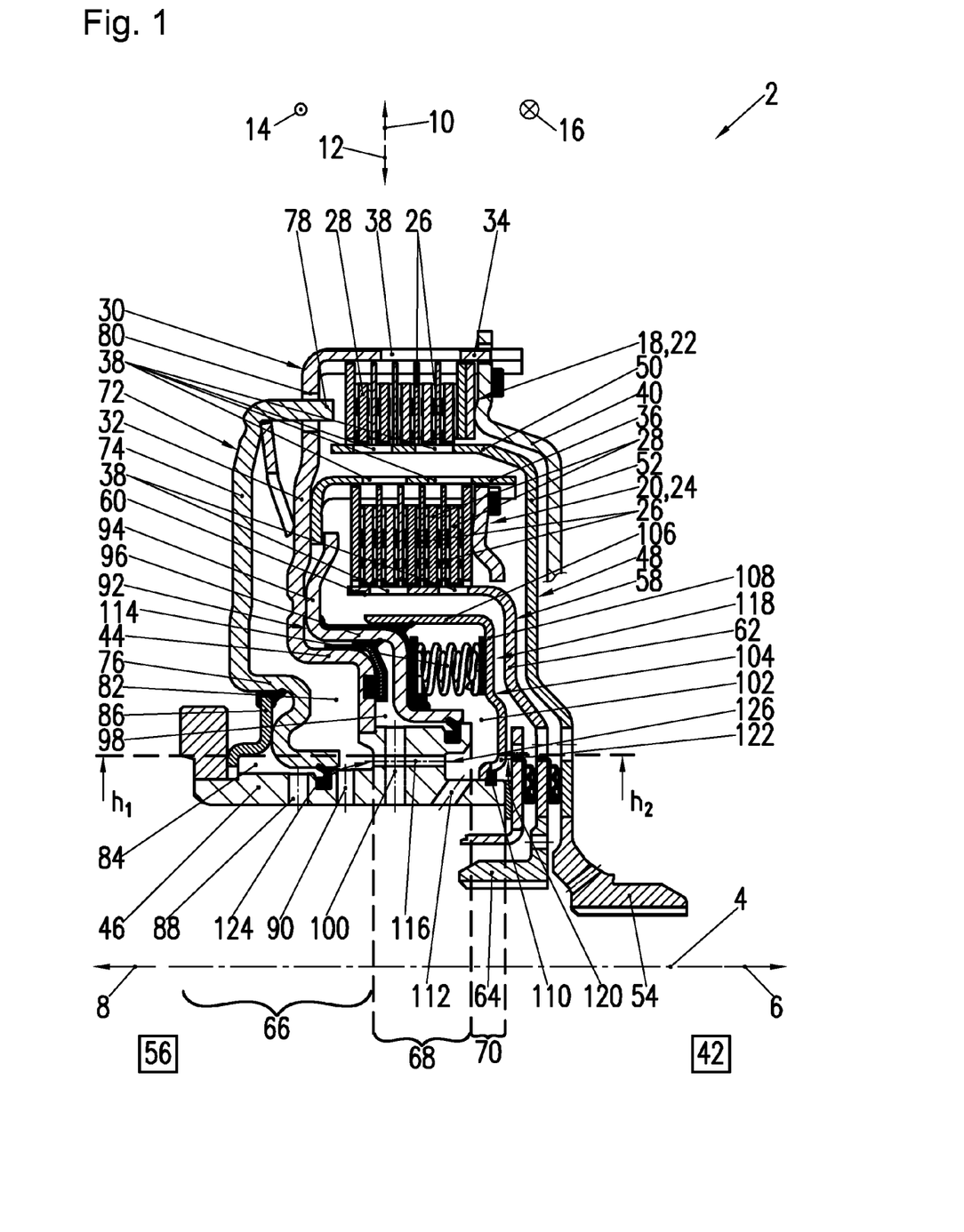
FIG. 1 shows a partial side view of a first embodiment of the multiple clutch device according to the invention, in a sectional illustration.

FIG. 1 shows a first embodiment of the multiple clutch device 2 according to the invention. The rotational axis 4 of the multiple clutch device 2 is indicated using a dashed line. Furthermore, the opposed axial directions 6, 8, the opposed radial directions 10, 12 and the opposed circumferential directions 14, 16 of the multiple clutch device 2 are indicated using corresponding arrows.

The multiple clutch device 2 has a first clutch 18 and a second clutch 20, with the result that the multiple clutch device 2 in the embodiment shown is a dual clutch. Here, the first clutch 18 and the second clutch 20 are arranged in a nested manner in the radial direction 10, 12, that is to say the first clutch 18 surrounds the second clutch 20 in the radial direction 10 from the outside, for which reason the first clutch 18 can also be referred to as the outer clutch, while the second clutch 20 can also be called the inner clutch. Here, a concentric multiple clutch device 2 is also referred to. The first clutch 18 is formed by a first multiple disk assembly 22, while the second clutch 20 is formed by a second multiple disk assembly 24. The multiple disk assemblies 22, 24 are composed in each case of a multiplicity of outer disks 26 and a multiplicity of inner disks 28, the outer and inner disks 26, 28 being arranged alternately behind one another in the axial direction 6, 8.

The two multiple disk assemblies 22, 24 are assigned a common, cup-shaped outer disk carrier 30. The outer disk carrier 30 has a supporting section 32 which extends in the radial direction 10, 12 and serves to support the outer disk carrier 30 in the radial direction 12 to the inside. Furthermore, a tubular outer disk carrying section 34 and a tubular inner disk carrying section 36 are provided on the supporting section 32, which disk carrying sections 34, 36 extend in the axial direction 6 starting from the supporting section 32 and are arranged in a nested manner in the radial direction 10, 12. While the outer disk carrying section 34 has a rotary driving connection to the outer disks 26 of the first multiple disk assembly 22, the outer disks 26 of the second multiple disk assembly 34 have a rotary driving connection with the inner disk carrying section 36. Oil passage openings 38, via which oil can pass through in the radial direction 10, are provided both in the outer disk carrying section 34 and in the inner disk carrying section 36. The outer disk carrying section 34 and therefore the entire outer disk carrier 30 have a rotary driving connection via a rotary driver part 40 to the engine side 42 which lies in the axial direction 6, the rotary driver part 40 preferably being configured as a part of a torsional vibration damper which is arranged between the multiple clutch device 2 and the engine side 42. The lower part of the supporting section 32 is formed by a cup-shaped section 44, the cup-shaped section 44 being connected by way of its end which points in the radial direction 12 to the inside in a rotationally fixed manner to a clutch hub 46.

Furthermore, the first multiple disk assembly 22 is assigned a first inner disk carrier 48. The first inner disk carrier 48 has a tubular disk carrying section 50 which has a rotary driving connection to the inner disks 28 of the first multiple disk assembly 22 and in which once again oil passage openings 38 are provided. The disk carrying section 50 can be supported in the radial direction 12 via a supporting section 52 which extends in the radial direction 10, 12, a first output hub 54 which can be connected in a rotationally fixed manner to a first transmission input shaft (not shown) of a transmission side 56 being arranged at that end of the supporting section 52 which points in the radial direction 12 to the inside. In a corresponding manner, the second multiple disk assembly 24 is assigned a second inner disk carrier 58 which once again has a tubular disk carrying section 60 with oil passage openings 38, a supporting section 62 and a second output hub 64 which is arranged on the supporting section 62, it being possible for said second output hub 64 to be connected in a rotationally fixed manner to a second transmission input shaft (not shown) of the transmission side 56.

The clutch hub 46 comprises substantially a first axial section 66 which lies in the axial direction 8 and a second axial section 68 which adjoins the former in the axial direction 6. The second axial section 68 has a greater external diameter than the first axial section 66, that is to say the second axial section 68 protrudes in the radial direction 10 to the outside, the abovementioned cup-shaped section 44 of the supporting section 32 of the outer disk carrier 30 being fixed in a rotationally fixed manner to the outside of the second axial section 68. In the axial direction 6, the second axial section 68 of the clutch hub 46 is adjoined by a third axial section 70 which in turn has a smaller external diameter than the second axial section 68.

In order for it to be possible to compress the first multiple disk assembly 22 in the axial direction 6, 8, the first multiple disk assembly 22 is assigned a first actuating piston 72, the first actuating piston 72 being arranged in the axial direction 8 behind the supporting section 32 of the outer disk carrier 30 and being displaceable in the axial direction 6, 8. The first actuating piston 72 is supported in the radial direction 12 to the inside on the first axial section 66 of the clutch hub 46 and has substantially a force transmission section 74 which extends in the radial direction 10, 12 and a piston-like section 76 which lies in the radial direction 12 on the inside. Protruding actuating fingers 78 are provided in the radial direction 10 on the outside of the force transmission section 74, which actuating fingers 78 extend in the axial direction 6 through windows 80 within the supporting section 32 of the outer disk carrier 30, in order for it to be possible for them to act on the first multiple disk assembly 22.

The piston-like section 76 dips in the axial direction 6 into the cup-shaped section 44 of the supporting section 32 of the outer disk carrier 30, with the result that an annular first pressure equalization chamber 82 is produced which is delimited by the piston-like section 76, the cup-shaped section 44 and the clutch hub 46. On that side of the piston-like section 76 which lies opposite in the axial direction 8, an annular first pressure chamber 84 is in turn formed which is delimited by a bounding, wall 86 which is fastened to the clutch hub 46, by the piston-like section 76 and by the clutch hub 46 itself. Furthermore, at least one supply channel 88 is provided in the clutch hub 46, via which supply channel 88 the first pressure chamber 84 is supplied with the pressure medium which is preferably oil. The targeted introduction of the oil into the first pressure chamber 84 thus brings about a displacement of the actuating piston 72 in the axial direction 6, with the result that the first clutch 18 is actuated or the first multiple disk assembly 22 of the latter is compressed by this. Here, the supply channels 88 are preferably cast or drilled into the clutch hub 46. In order, furthermore, for it to be possible to supply the first pressure equalization chamber 82 with oil, at least one equalization channel 90 is formed in the clutch hub 46. For example, the equalization channel 90 in the present embodiment can also be cast or drilled into the clutch hub 46.

In order for it to be possible to actuate the second clutch 20 independently of the first clutch 18, a second actuating piston 92 is provided, furthermore. In contrast to the first actuating piston 72, the second actuating piston 92 is arranged in the axial direction 8 in front of the supporting section 32 of the outer disk carrier 30. Otherwise, the second actuating piston 92 in turn has a force transmission section 94 which extends in the radial direction 10, 12 and a piston-like section 96 which adjoins the force transmission section 94 in the radial direction 12. The force transmission section 94 is assigned directly to the second multiple disk assembly 24, that is to say it does not require any actuating fingers at all, as was the case with the first actuating piston 72.

The piston-like section 96 is supported in the radial direction 12 on the second axial section 68 of the clutch hub 46, the second actuating piston 92 being displaceable in the axial direction 6, 8. Moreover, the piston-like section 96 of the second actuating piston 92 is supported in the radial direction 12 on the cup-shaped section 44 of the supporting section 32 of the outer disk carrier 30, especially since the cup-shaped section 44 dips in the axial direction 6 into the piston-like section 96 of the second actuating piston 92. The second actuating piston 92 is also assigned an annular pressure chamber which is called the second pressure chamber 98 in the following text. The second pressure chamber 98 is delimited by the cup-shaped section 44, the piston-like section 96 and the second axial section of the clutch hub 46. Furthermore, at least one supply channel 100 is once again formed within the clutch hub 46, via which supply channel 100 the oil passes into the second pressure chamber 98, in order to displace the actuating piston 92 in the axial direction 6 and therefore to compress the second multiple disk assembly 24.

The second actuating piston 92 is also assigned a pressure equalization chamber which is called the second pressure equalization chamber 102 in the following text. For this purpose, a pot-shaped or cup-shaped supporting plate 104 is provided. The supporting plate 104 has a radially outer tubular section 106 and a supporting section 108 which is adjacent in the axial direction 6 and extends in the radial direction 10, 12. The supporting section 108 is supported in the radial direction 12 on the third axial section 70 of the clutch hub 46 and is fixed releasably on the clutch hub 46 in the axial direction 6 via a securing ring 110. In principle, however, the supporting plate 104 could also be welded or connected non-releasably in another way to the clutch hub 46. The piston-like section 96 of the second actuating piston 92 dips in the axial direction 6 into the tubular section 106 of the pot-shaped or cup-shaped supporting plate 104, with the result that the second pressure equalization chamber 102 is delimited by the piston-like section 96, the supporting plate 104 and the clutch hub 46, the second pressure equalization chamber 102 likewise being of annular configuration, just like the first pressure equalization chamber 82. In order for it to be possible to introduce oil via the clutch hub 46 into the second pressure equalization chamber 102, once again at least one equalization channel 112 is provided in the clutch hub 46. Furthermore, at least one restoring spring 114 is provided for the second actuating piston 92 within the second pressure equalization chamber 102, which restoring spring 114 is supported on one side in the axial direction 6 on the supporting section 108 of the supporting plate 104 and on the other side in the axial direction 8 on the piston-like section 96 of the second actuating piston 92.

In order to bring about hydraulic fluid balancing for the two actuating pistons 72, 92, at least one further crossflow channel 116 and at least one second crossflow channel 118 are provided, furthermore. By rotation of the multiple clutch device 2 about the rotational axis 4, an axial force which acts on the actuating pistons 72, 92 in the axial direction 6 is produced in the pressure chambers 84, 98 by a radially extending first hydraulic fluid column, while an opposed axial force which acts on the actuating pistons 72, 92 in the axial direction 8 is produced in the pressure equalization chamber 82, 102 by a radially extending second hydraulic fluid column. Here, the crossflow channels 116, 118 open into the respective pressure equalization chamber 82, 102 in such a way that the length of the second hydraulic fluid column is set or shortened in the radial direction 10, 12 in such a way that the opposed axial forces which act on the actuating pistons 72, 92 are balanced, with the result that hydraulic fluid balancing can be achieved.

In the following text, the arrangement and the construction of the two crossflow channels 116, 118 will be described, first of all more detail being given on the second crossflow channel 118 which opens into the second pressure equalization chamber 102.

The second crossflow channel 118 has an inlet opening 120. The inlet opening 120 has been produced by at least one cutout 122 in the supporting section 108 of the supporting plate 104 and is arranged at a height $h_2$ in relation to the radial direction 10. The inlet opening 120 is adjoined by a section of the second crossflow channel 118 which extends substantially in the radial direction 10, 12 and is formed by the clearance between the supporting section 108 of the supporting plate 104 and the supporting section 62 of the second inner disk carrier 58. This section of the second crossflow channel 118 which extends in the radial direction 10, 12 is adjoined by a second section of the second crossflow channel 118 which extends substantially in the axial direction 8, said second section being formed by the clearance between the annular section 106 of the supporting plate 104 and the disk carrying section 60 of the second inner disk carrier 58.

In the case of a rotation of the multiple clutch device 2, the excess oil can pass out of the second pressure equalization chamber 102 via the inlet opening 120 and the second crossflow channel 118 as far as the oil passage openings 38 in the disk carrying section 60 of the second inner disk carrier 58. Afterward, the oil which is discharged via the second crossflow channel 118 passes through the oil passage openings 38 and passes to the second multiple disk assembly 24, where it cools and lubricates the second clutch 20. The oil which is discharged via the second crossflow channel 118 subsequently flows in the radial direction 10 through the oil passage openings 38 in the inner disk carrying section 36 and through the oil passage openings 38 in the disk carrying, section 50 and passes to the first multiple disk assembly 22, where it cools and lubricates the first clutch 18. Subsequently, the oil flows in the radial direction 10 through the oil passage openings 38 in the outer disk carrying section 34 to the outside. It can be seen from the above description that the oil which is discharged out of the pressure equalization chamber 102 via the second crossflow channel 118 is fed both to the second clutch 20 and to the first clutch 18, this taking place in the cited sequence.

The first crossflow channel 116 is formed within the second axial section 68 of the clutch hub 46. Here, the first crossflow channel 116 can be cast or drilled, for example, into the clutch hub 46. The first crossflow channel 116 has an inlet opening 124 which faces the first pressure equalization chamber 82 and is arranged at a height $h_1$ in relation to the radial direction 10. In the embodiment of FIG. 1, the height $h_1$ corresponds to the height $h_2$, that is to say $h_1=h_2$, and the inlet opening 124 of the first crossflow channel 116 is arranged at the same height in relation to the radial direction 10 as the inlet opening 120 of the second crossflow channel 118. Adjacent to the inlet opening 124, the first crossflow channel 116 extends rectilinearly and parallel with respect to the rotational axis 4 of the multiple clutch device 2 with bypassing of the second pressure chamber 98 as far as an outlet opening 126. Here, the outlet opening 126 is arranged at the same height $h_1$ in relation to the radial direction 10 as the inlet opening 124 and the inlet opening 120, and faces the second pressure equalization chamber 102. This means that the first crossflow channel 116 opens with its end which faces away from the inlet opening 124 into the second pressure equalization chamber 102 and therefore forms a type of connecting channel between the first pressure equalization chamber 82 and the second pressure equalization chamber 102. As an alternative, the first crossflow channel 116 could also open directly into the second crossflow channel 118.

In the case of a rotation of the multiple clutch device 2, the excess oil within the pressure equalization chamber 82 is discharged via the inlet opening 124, the crossflow channel 116 and the outlet opening 126 in such a way that said oil first of all passes into the second pressure equalization chamber 102. Subsequently, both the oil which is discharged out of the first pressure equalization chamber 82 via the first crossflow channel 116 and the excess oil within the second pressure equalization chamber 102 can be discharged in the manner described above via the second crossflow channel 118 and can be fed to the second and first clutches 20, 18. Accordingly, both the excess oil within the first pressure equalization chamber 82 and the excess oil within the second pressure equalization chamber 102 are fed to both clutches 20, 18 of the multiple clutch device 2, with the result that effective cooling and lubrication of both clutches 20, 18 is achieved.

Figure 2:
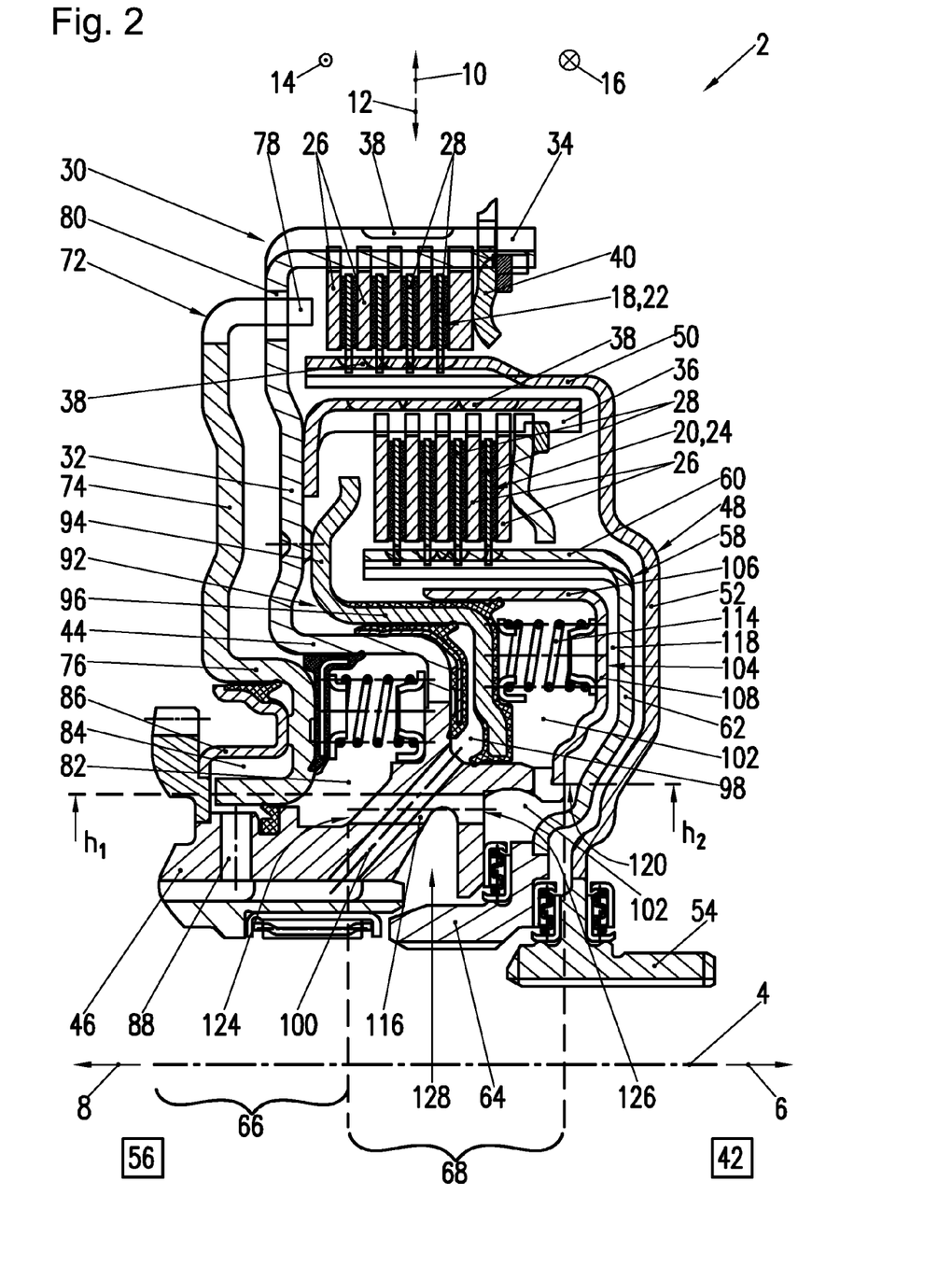
FIG. 2 shows a partial side view of a second embodiment of the multiple clutch device according to the invention, in a sectional illustration.

FIG. 2 shows a second embodiment of the multiple clutch device 2 according to the invention; in the following text, only the differences from the first embodiment according to FIG. 1 will be described in detail, identical or similar parts are provided with the same designations and the previous description of the first embodiment is otherwise valid accordingly.

In the second embodiment, once again an equalization channel 128 is formed in the clutch hub 46, via which equalization channel 128 the oil can pass into the two pressure equalization chambers 82 and 102. However, the equalization channel 128 does not extend directly as far as said pressure equalization chambers 82, 102, but rather opens before them into the first crossflow channel 116, with the result that there is a flow connection between the equalization channel 128 and the first crossflow channel 116. In this way, the equalization channel 128 serves to guide the oil first of all in the radial direction as far as into the first crossflow channel 116. From there, the oil which is situated in the crossflow channel 116 passes firstly in the axial direction 8 via the inlet opening 124 into the first pressure equalization chamber 82 and secondly in the axial direction 6 via the outlet opening 126 into the second pressure equalization chamber 102. The manufacture of the clutch hub 46 is simplified substantially by the equalization channel 128 being supplemented by the first crossflow channel 116.

In the second embodiment shown, furthermore, the equalization channel 128 is configured as a circumferential, inner groove on the clutch hub 46, which groove has preferably been milled or turned into the radially inwardly pointing side of the clutch hub 46. As an alternative, however, the circumferential groove which forms the equalization channel 128 can also have already been cast into the clutch hub 46. Thanks to the circumferential groove which forms the equalization channel 128, the oil supply via the equalization channel 128 and the first crossflow channel 116 to the pressure equalization chambers 82, 102 is simplified further and improved.

In contrast to the first embodiment, the inlet openings 120, 124 of the crossflow channels 116, 118 are arranged at different heights $h_1$ and $h_2$ in relation to the radial direction 10. In the embodiment shown, the inlet opening 124 of the first crossflow channel 116 is arranged further to the inside in the radial direction 12 than the inlet opening 120 of the second crossflow channel 118, that is to say $h_1 < h_2$. The height $h_2$ of the inlet opening 120 of the second crossflow channel 118 is also determined by the radially inwardly pointing edge of the supporting plate 104. As an alternative to this, however, cutouts 122 could likewise be provided in the supporting section 108 of the supporting plate 104 in order to form the inlet opening 120, as has already been described with reference to the first embodiment according to FIG. 1. In this case, more complex drilling or milling machining of the clutch hub 46 would be dispensed with.

LIST OF DESIGNATIONS

2 Multiple clutch device
4 Rotational axis
6 Axial direction
8 Axial direction
10 Radial direction
12 Radial direction
14 Circumferential direction
16 Circumferential direction
18 First clutch
20 Second clutch
22 First multiple disk assembly
24 Second multiple disk assembly
26 Outer disks
28 Inner disks
30 Outer disk carrier
32 Supporting section
34 Outer disk carrying section
36 Inner disk carrying section
38 Oil passage openings
40 Rotary driver part
42 Engine side
44 Beaker-shaped section
46 Clutch hub
48 First inner disk carrier
50 Disk carrying section
52 Supporting section
54 First output hub
56 Transmission side
58 Second inner disk carrier
60 Disk carrying section
62 Supporting section
64 Second output hub
66 First axial section
68 Second axial section
70 Third axial section
72 First actuating piston
74 Force transmission section
76 Piston-like section
78 Actuating finger
80 Window
82 First pressure equalization chamber
84 First pressure chamber
86 Bounding wall
88 Supply channel
90 Equalization channel
92 Second actuating piston
94 Force transmission section
96 Piston-like section
98 Second pressure chamber
100 Supply channel
102 Second pressure equalization chamber
104 Supporting plate
106 Tubular section
108 Supporting section
110 Securing ring
112 Equalization channel
114 Restoring spring
116 First crossflow channel 118 Second crossflow channel
120 Inlet opening
122 Cutout
124 Inlet opening
126 Outlet opening
128 Equalization channel
$h_1$ Height
$h_2$ Height

The invention claimed is:

1. A multiple clutch device having a first clutch assigned a first actuating piston with a first pressure chamber and a first pressure equalization chamber, and having a second clutch assigned a second actuating piston with a second pressure chamber and a second pressure equalization chamber, a first crossflow channel for setting a hydraulic fluid column in the first pressure equalization chamber and a second crossflow channel for setting a hydraulic fluid column in the second pressure equalization chamber, wherein the first and second crossflow channels are arranged such that both oil discharged via the first crossflow channel and oil discharged via the second crossflow channel can be fed to the first and second clutches;

the multiple clutch device further including a clutch hub, and an equalization channel formed in the clutch hub for supplying the first and second pressure equalization chambers with oil, wherein the first crossflow channel is also formed in the clutch hub, wherein the equalization channel opens into the first crossflow channel for direct flow-connection therewith, and wherein the equalization channel is formed as a circumferential inner groove on the clutch hub.

2. The multiple clutch device as claimed in claim 1, wherein the first crossflow channel is arranged such that oil discharged via the first crossflow channel can be fed to the second pressure equalization chamber and the second crossflow channel to feed the oil which is discharged via the first crossflow channel both to the first and to the second clutch.

3. The multiple clutch device as claimed in claim 1, wherein the first crossflow channel bypasses the second pressure chamber.

4. The multiple clutch device as claimed in claim 3, wherein supply channels are formed in the clutch hub for supplying the first and second pressure chambers with the pressure medium, the supply channels being cast or drilled into the clutch hub.

5. The multiple clutch device as claimed in claim 3, the equalization channel being one of cast, milled, turned and drilled into the clutch hub.

6. The multiple clutch device as claimed in claim 5, wherein the equalization channel is flow-connected to the first crossflow channel in such a way that the oil can be fed to the first and second pressure equalization chambers via the equalization channel and the first crossflow channel.

7. The multiple clutch device as claimed in claim 6, wherein the first crossflow channel extends parallel to the rotational axis of the multiple clutch device, rectilinearly, and the inlet and outlet openings of the first crossflow channel are arranged at the same height in relation to the radial direction.

8. The multiple clutch device as claimed in claim 1, wherein the first crossflow channel and the second crossflow channel in each case have an inlet opening, the inlet openings being arranged at different heights in relation to the radial direction.

9. The multiple clutch device as claimed in claim 8, wherein the inlet opening of the first crossflow channel is radially inwardly of the inlet opening of the second crossflow channel.

10. The multiple clutch device as claimed in claim 1, wherein the first and second clutches are arranged in a nested manner in the radial direction.

11. The multiple clutch device as claimed in claim 1, wherein the first and second crossflow channels are arranged in such a way that the oil which is discharged via the first and second crossflow channels can be fed first to one clutch and subsequently to the other clutch.

12. The multiple clutch device as claimed in claim 1, wherein the first clutch is formed by a first multiple disk assembly and the second clutch is formed by a second multiple disk assembly, the first and second multiple disk assemblies being assigned multiple disk carriers which have oil passage openings, via which the oil which is discharged via the crossflow channels can be guided from one multiple disk assembly to the other multiple disk assembly in the radial direction.

13. The multiple clutch device as claimed in claim 1, wherein the second crossflow channel is formed between a multiple disk carrier, an inner disk carrier of one of the clutches, and a cup-shaped support plate on the clutch hub which delimits the second pressure equalization chamber, a restoring spring for the second actuating piston supported firstly on the support plate and secondly on the second actuating piston in the axial direction.

14. The multiple clutch device as claimed claim 1, wherein by rotation of the multiple clutch device, an axial force acts on the actuating piston in the pressure chamber by a radially extending first hydraulic fluid column, and an opposite axial force acts on the actuating piston in the pressure equalization chamber by a radially extending second hydraulic fluid column, the crossflow channel opening into the pressure equalization chamber such that the length of the second hydraulic oil column is shortened in the radial direction such that the axial forces oppose one another and act on the actuating piston to substantially balance one another.

* * * * *

UNITED STATES PATENT AND TRADEMARK OFFICE
CERTIFICATE OF CORRECTION

PATENT NO. : 8,511,450 B2  
APPLICATION NO. : 12/994191  
DATED : August 20, 2013  
INVENTOR(S) : Eckart Gold, Marcus Hertel and Tobias Groepper Page 1 of 1

It is certified that error appears in the above-identified patent and that said Letters Patent is hereby corrected as shown below:

On the Title Page, Item (73) the Assignee should read:
"BorgWarner" and not "Borgwarner"

In the Specification

Column 2, line 57:
"multiple cluth device, in which construction the oil which is" should read "multiple clutch device, in which construction of the oil which is"

Column 5, lines 58-59:
"carrier and the support plate can be used as second crossflow channel." should read "carrier and the support plate can be used as a second crossflow channel."

Column 12, line 6:
"would be dispensed with." should read "would be dispensed."

Signed and Sealed this  
Nineteenth Day of November, 2013

Teresa Stanek Rea  
*Deputy Director of the United States Patent and Trademark Office*